United States Patent
Griffin et al.

(10) Patent No.: US 7,598,846 B2
(45) Date of Patent: Oct. 6, 2009

(54) VEHICLE DISABLE SYSTEM

(75) Inventors: R. Clarkson Griffin, Carmel, IN (US); Gerald P. Hunt, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 704 days.

(21) Appl. No.: 10/784,638

(22) Filed: Feb. 23, 2004

(65) Prior Publication Data

US 2005/0184858 A1 Aug. 25, 2005

(51) Int. Cl.
*B60R 25/10* (2006.01)

(52) U.S. Cl. .............. 340/426.11; 340/426.13; 340/5.31; 340/825.29; 123/179.2; 123/179.4; 307/10.3; 307/10.6; 701/2; 701/24; 701/36

(58) Field of Classification Search ........... 340/425.11, 340/426.1, 426.13, 426.19, 989, 5.31, 426.15, 340/426.3, 825.29, 439; 307/10.1, 10.2, 307/10.3, 10.6; 701/2, 33, 29, 36, 35, 117, 701/24; 455/418, 419; 123/179.2, 179.4
See application file for complete search history.

(56) References Cited

U.S. PATENT DOCUMENTS

| | | | | |
|---|---|---|---|---|
| 4,067,411 | A * | 1/1978 | Conley et al. ............... | 180/169 |
| 5,619,412 | A * | 4/1997 | Hapka ......................... | 701/36 |
| 5,835,868 | A * | 11/1998 | McElroy et al. ................ | 701/2 |
| 5,945,936 | A * | 8/1999 | Issa ............................ | 341/176 |
| 6,556,899 | B1 * | 4/2003 | Harvey et al. ................. | 701/29 |
| 6,563,910 | B2 * | 5/2003 | Menard et al. | |
| 6,677,854 | B2 * | 1/2004 | Dix ............................ | 340/438 |
| 6,810,244 | B2 * | 10/2004 | Bristow et al. .............. | 455/418 |
| 6,873,246 | B1 * | 3/2005 | Ligoci et al. ................ | 340/5.31 |
| 7,119,696 | B2 * | 10/2006 | Borugian ..................... | 340/576 |
| 7,233,814 | B2 * | 6/2007 | Wissinger et al. ......... | 455/569.2 |

* cited by examiner

*Primary Examiner*—Davetta W Goins
(74) *Attorney, Agent, or Firm*—Jimmy L. Funke

(57) ABSTRACT

A vehicle disable system including an onboard computer linked to a throttle control relay. The onboard computer is capable of communicating to a remote control center by way of telecommunications link. If certain security protocols are breached, the control center communicates a shutdown command to the vehicle by way of the telecommunications link and the vehicle initiates a shutdown procedure for incapacitating the vehicle throttle controls.

24 Claims, 2 Drawing Sheets

VEHICLE DISABLE SYSTEM

TECHNICAL FIELD

The present invention generally relates to security systems and more particularly relates to systems for disabling the movement of a vehicle.

BACKGROUND OF THE INVENTION

Existing vehicle security systems are primarily antonymous systems used to detect theft or vandalization of a vehicle, vehicle components, or unauthorized vehicle entry. More sophisticated vehicle security systems exist that provide some form of vehicle status information which is relayed back to a monitoring center. The OnStar® provides the ability for the vehicle operator to electronically communicate by way of "voice communications" with someone manning a monitoring center. These communications are typically used to verbally provide routing, and other navigational information to the vehicle operator. They are also used by the vehicle operator to communicate vehicle operational problems to call center so that the appropriate assistance can be dispatched to the vehicle operator.

In view of the recent homeland security issues, protecting vehicles against theft or vandalism has become secondary, giving way to a primary concern of protecting citizens from vehicles that could possibly used for mass destruction of property or human life. The present invention is particularly well suited to remotely disable any vehicle in a controlled manner thereby allowing the vehicle operator, at all times, maintain control of the vehicle.

DETAILED DESCRIPTION OF THE PREFERRED EMBODIMENT

Figure 1:
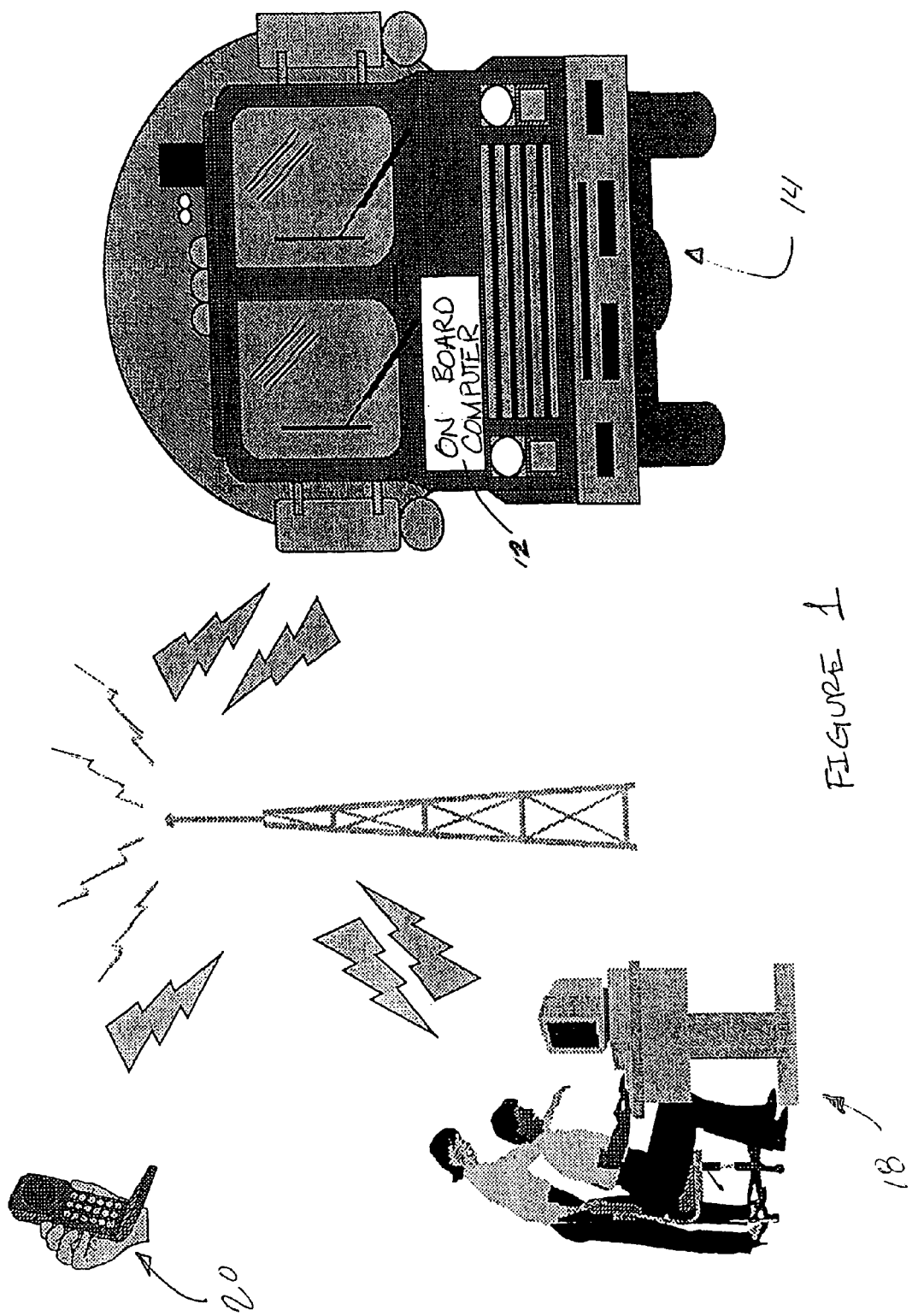
FIG. 1 is a diagrammatic depiction of the various communication links and methods used by the disable system of the present invention to communicate with, and to disable, a vehicle.
Figure 2:
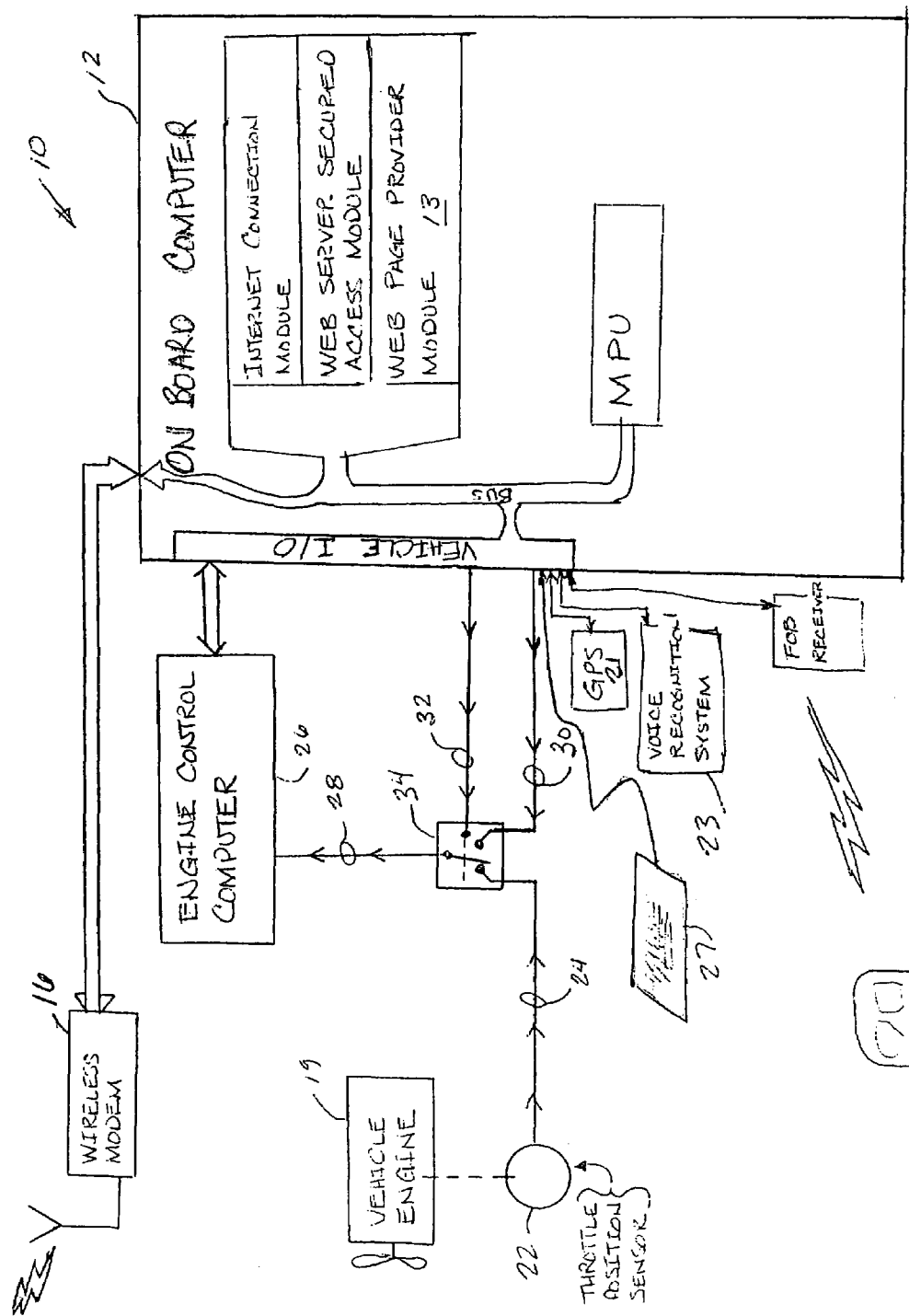
FIG. 2 is a diagrammatic view of the hardware used to implement the preferred of the disclosed vehicle disable system.

Now referring to FIGS. 1 and 2, the vehicle disable system 10 of the present invention is preferably integrated with onboard computer 12 of vehicle 14. Although the present invention will be primarily discussed as it applies to heavy duty truck vehicles, there is nothing that prohibits using the present invention on any type of vehicle, including automobiles and aquatic based vehicles. Modern trucks typically employ an onboard computer 12 to manage a whole host of vehicle operations. Onboard computer 12 is typically mounted under the dash of vehicle 14; however, it can also be mounted in other locations within the vehicle passenger compartment as well as in the engine compartment. Onboard computer 12 is used to carry out the logic methodology (herein set forth in detail below) associated with disabling the vehicle in a controlled manner. Although the preferred embodiment of the present invention is to implement the truck disable system 10 by way of a digital, onboard computer 12, it is to be understood that disable system 10 can also be implemented, equally as well, using discrete digital logic and/or well known analog electronic circuit components. It is also contemplated that the truck disable system 10 of present invention is equally suited for both original equipment manufacture and as an after market unit (sold for installation on existing vehicles).

Wireless modem 16 provides the communication link between onboard computer 12 and control center 18. The communication format between control center 18 on onboard computer 12 can take place in any number of formats such as Plain Old Telephone Service (POTS), or, by way of, an internet link.

Security Modes

The following describes four preferred security modes in which vehicle disable system 10 can be operated. All of these four modes include disabling vehicle 14 in a secure, controlled manner thereby preventing unauthorized movement of the vehicle. In cases where vehicle 14 is transporting dangerous substances, vehicle disable system 10 will eliminate, or substantially impede, any attempts to steal or misuse the vehicle.

Reported Theft Security Mode

In this scenario, the vehicle driver reports the theft of vehicle 14 to call center 18. This method of communication between the vehicle operator and call center 18 would, in most instances, take place over a conventional telephone communication link 20. Thereafter, call center 18 communicates with vehicle 14 using POTS or, the IP address assigned to onboard computer 12. When the internet is used as the means of effecting communication between control center 18 and vehicle 14, conventional password technology can be used to secure the integrity of the internet communications session.

Onboard computer 12 includes an internet connection module, a web server secured access module, and a web page provider module. These three modules in conjunction with wireless modem 16 enable onboard computer 12 to communicate with command center 18 by way of the internet. Upon receipt of a correct password from control center 18, serves a webpage to call center 18 by way of the web page provider module 13. The served web page gives various system options to call center 18 operators, one of which is the shutdown option. If call center 18 operators select the shutdown option, onboard computer 12 requests confirmation from call center 18 by requesting a vehicle shutdown password. Upon receiving a valid password, onboard computer 12 initiates a shutdown sequence. This shutdown sequence includes, amongst other things, disabling the throttle position sensor signal received by engine control computer 26 on signal input line 28. This interruption can take place using any number of techniques, such as by using computer 12 to place a voltage reference signal on line 30 which is equivalent to an engine idle reference signal. Once this "engine idle" voltage reference is placed on line 30, computer 12 activates relay 32 by way of control line 32 thereby removing from line 28 the signal present from line 24 and replacing it with the signal from line 30. This causes engine control computer 26 to receive an engine idle command thereby causing the engine to enter into an idle mode. Thus, the present invention is effective for essentially eliminating throttle position sensor 22 from the circuit causing the engine to "think" that the driver is not depressing the accelerator pedal. By disabling the vehicle in this manner, engine power is still made available for enabling power steering and power braking assist functions. It is critical that these power assist functions stay intact during a controlled shutdown operation so that if the vehicle is moving, the vehicle operator can maneuver the vehicle to a safe location.

Relay 34 is shown in FIG. 2 in a deenergized state. In this deenergized state, engine throttle position sensor 22 communicates directly with engine control computer 26 via lines 24, and 28. In an alternative embodiment, relay 34, when deenergized, can be placed in a state whereby line 28 is electrically connected to line 30. This has the distinct advantage that before the vehicle engine 19 can be taken out of an idle mode, onboard computer 12 must be active (in order to activate relay 34 by way of line 32). It is also contemplated in the present invention that relay 34 can be integrated into the housing of throttle position sensor 22. This integration may have both cost and security advantages. Although lines 24, 28, 30 and 32 are in their simplest embodiment, simple, single conductors, it is anticipated that digital bus communication can be used to communicate between computer 12 and relay 34. This digital data interface could be implemented in any number of well know formats including pulse width modulation, or serial data interface (such as RS-232, J1587, J1939, etc.). When onboard computer 12 is commanded (via control center 18) to disable vehicle 14, it applies a voltage to the relay (by way of line 32) causing line 28 to be disconnected from line 24 and to be connected to line 30. As was mentioned above, the voltage provided on line 30 is such that the engine control computer 26 understands that it is now being commanded to put the engine in an idle condition.

Route Tracking Security Mode

Tracking vehicle 14 using periodic GPS (Global Positioning System) by way of a wireless internet connection is possible by virtue of using well known global position sensor technology. Specifically, an onboard global positioning system 21 can be used to receive GPS signals and translate those signals into vehicle position information which is sent to control center 18 via wireless modem 16. It is contemplated that the control center can compare the received GPS signals with preprogrammed route information. If vehicle 14 deviates from the preprogrammed route by more than a predetermined distance, control center 18 can initiate communications with the vehicle operator asking him to input a password in order to permit continued operation of the vehicle. If the password is not entered, or is entered incorrectly, control center 18 can initiate vehicle shutdown as discussed above.

Periodic Driver Authentication Security Mode

Under this methodology, driver authentication is conducted either periodically or every ignition cycle (every time the vehicle engine 19 starts), by forcing the driver to enter an identification number. A technique of required periodic entry of an ID number guarantees that the driver is authorized even when remote communications are not possible between onboard computer 12 and command center 18. Such communications might not be possible when adverse weather conditions prohibit telecommunications between wireless modem 16 and control center 18. The periodic entry of the driver ID ensures that the driver is the driver authorized to operate the vehicle. This ID can be either fixed, changed periodically by control center 18, or changed automatically by some other means based on a shared "rolling code" algorithm. The implementation of a "rolling code" algorithm requires the truck driver to have a means for obtaining new IDs as a function of time/date (e.g., a secure ID). This ID would be a function of time, date and the vehicle ID.

Where the function is a standard crypto-rolling code, the ID can be entered either by way of a keyboard 27 connected directly to onboard computer 12 or by way of voice input processed by a voice recognition module 23. ID input by way of voice communication is the preferred mode of data input by the vehicle driver because it promotes greater levels of safety by allowing the vehicle operator to communicate with computer 12 while still keeping his "eyes on the road." In normal situations, when there is a low level security alert status, computer 12 may only require driver ID verification every two to four hours or so. This infrequent ID request will have minimal impact on the driver's normal driving routine; however, in times when the nation is put on high alert status, control center 18 can require more frequent verification of driver ID (perhaps as frequently as every 15 minutes or so). This increased level of driver inconvenience is offset by the need of greater diligence during times of "high alert" status. The internet connectivity of computer 12 permits this level of dynamic behavior.

Alarm Security Mode

In the event of a hijack attempt, the truck driver can press an alarm button on a keyboard connected to computer 12 or manually activate a panic button on a remote key FOB transmitter 25. A remote transmitter could also be used to immediately enable the security features of vehicle 14 thereby requiring reentry of the driver ID before the vehicle could be operated. In the alarm security mode, control center 18 would be immediately notified via the wireless modem link that a problem as occurred.

The invention claimed is:

1. A vehicle disable system, comprising:
an onboard computer; and
a communications system linked to said onboard computer, said communications system is capable of communicating to a remote control center by way of a telecommunications link;
wherein said onboard computer includes means for acting on a shutdown command from said remote control center, and means for interrupting a throttle command signal generated by a throttle position sensor.

2. The system of claim 1, wherein said communications system includes a wireless modem.

3. The system of claim 1, wherein said onboard computer includes an internet connection module.

4. The system of claim 3, wherein said onboard computer further includes a web server secured access module.

5. The system of claim 4, wherein said onboard computer further includes a web page provider module.

6. The system of claim 1, wherein said communications system further includes at least one of a voice input link, or a keyboard input links coupled to said onboard computer.

7. The system of claim 1, wherein said onboard computer is coupled to a throttle signal.

8. The system of claim 7, wherein said coupling includes a serial communications link.

9. A method for incapacitating a vehicle, comprising the steps of:
receiving information into a control center; and
sending from said control center, by way of a wireless communication, a shutdown command to an onboard computer mounted in said vehicle;
wherein said onboard computer is configured to initiate a shutdown sequence that places said vehicle in an idle mode by disabling a throttle position sensor.

10. The method of claim 9, wherein said shutdown command is sent over the internet by way of a wireless modem.

11. The method of claim 10, wherein the step of receiving information into a control center includes receiving information from a vehicle operator.

12. The method of claim 10, wherein the step of receiving information into a control center includes receiving information from a Global Position Sensor mounted in said vehicle.

13. The method of claim 12, wherein said Global Position Sensor communication takes place over the internet.

14. The method of claim 12, wherein receiving information includes receiving preprogrammed route information.

15. The method of claim 14, further including the step of comparing said preprogrammed route information with information collected by a Global Position Sensor system mounted in the vehicle.

16. A method for incapacitating a vehicle, comprising the steps of:
   receiving a signal initiated by the vehicle driver;
   checking the validity of the signal according to a predetermined protocol; and
   incapacitating the vehicle if the step of checking the validity of the signal violates the terms of the predetermined protocol, wherein said incapacitating step includes forcing the vehicle engine into an idle mode by disabling a throttle position sensor.

17. The method of claim 16, wherein said signal is initiated by said driver by way of using a remote FOB transmitter.

18. The method of claim 16, wherein said signal is initiated by said driver by way of using an input device to input an ID number.

19. The method of claim 18, wherein said ID number is periodically reassigned using a rolling code algorithm.

20. The method of claim 19, wherein said rolling code algorithm is administered by a call center remote from said vehicle.

21. The method of claim 19, wherein said rolling code algorithm is a function of time and vehicle ID.

22. The method of claim 16, wherein the received signal is initiated by said driver using a battery operated, wireless transmitter.

23. The method of claim 16, wherein forcing said engine into an idle mode includes serially communicating with a throttle relay.

24. The method of claim 9, wherein said shutdown sequence includes;
   disabling a throttle position signal received by an engine control computer; and
   applying a reference voltage signal from said onboard computer to said engine control computer that places the engine in an idle mode.

* * * * *